United States Patent Office 2,879,678
Patented Mar. 31, 1959

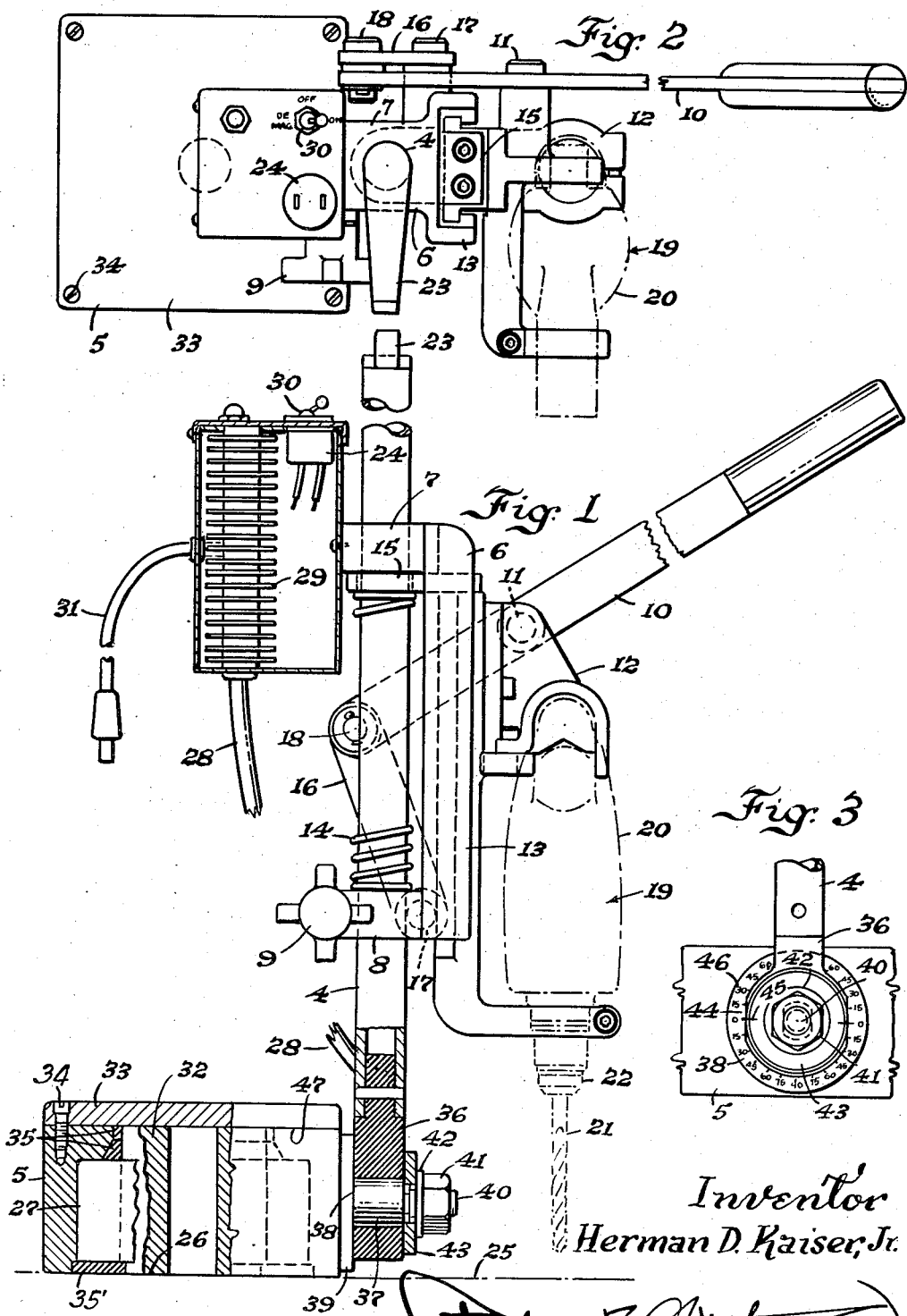

2,879,678

DRILL STAND WITH ADJUSTABLE AND REVERSIBLE ELECTRO-MAGNETIC BASE

Herman D. Kaiser, Jr., Belvidere, Ill., assignor to Design Engineers, Rockford, Ill., a copartnership Application July 25, 1956, Serial No. 600,115

2 Claims. (Cl. 77—59)

This invention relates to a new and improved drill stand equipped with an adjustable and reversible electro-magnetic base, so that the holding face may be set at any angle with respect to the column for the drilling of holes at angles, and may be turned down to take hold of a large work piece, like a machine tool base, for example, into which a hole or holes are to be drilled, but when the base is reversed with the holding face up smaller work pieces to be drilled may be held electro-magnetically during the drilling thereof.

The present unit is designed to facilitate machining and drilling that is now usually done by hand with difficulty and not too satisfactorily, particularly on larger and heavier metal parts, in places that are either too hard to reach or are so disposed angularly as not to enable working thereon satisfactorily with standard power-operated machine tools. A unit of this kind will also find many uses on the assembly floor in making alterations. The electro-magnetic base furthermore enables many uses where the present conventional type drill stand could not be used to drill into a surface on which it rests due to the drilling pressure tending to lift the stand off the surface, the inverted electro-magnetic base in such situations preventing tipping of the drill stand. The electro-magnetic base besides being reversible is adjustable accurately to any angle through 360°, thus opening up a wide range of operations to reach places which could not be operated upon in any other way. The drill head is also adjustable around the column through 360° to further widen the range of uses of this drill stand.

The invention is illustrated in the accompanying drawing, in which—

Fig. 1 is a side view of a drill stand with reversible and adjustable electro-magnetic base made in accordance with my invention, showing the stand with the base inverted so that the holding surface is down to support the stand on the surface of a large work piece, like a machine tool base, for example, into which a hole or holes are to be drilled;

Fig. 2 is a top view of the unit, and

Fig. 3 is a side view of the base portion of the drill stand showing the calibrations provided thereon to indicate the angle of adjustment of the column with respect to the base for angular drilling.

The same reference numerals are applied to corresponding parts throughout these views.

Referring to the drawing, the reference numeral 4 designates the hollow cylindrical column or post of the drill stand and 5 the electro-magnetic base which, although herein shown as of rectangular form, may be round or of any other form. 6 is the drill holder bracket having a top bearing 7 rotatable on column 4 and a bottom bearing 8 that is also rotatable on the column but is split and adapted to be clamped in adjusted position by means of a hand screw 9. A drill feed lever 10 is pivoted at 11 to the top portion of the drill holder 12 which is slidable vertically in guides 13 on bracket 6 against the resistance of a coiled compression spring 14 that surrounds the column 4 and bears at its lower end on top of bearing 8 and at its upper end against the under side of an arm 15 that is rigid with the drill holder 12 and slides up and down on the column 4. A link 16 pivoted at one end as at 17 on the lower end of bracket 6 is pivotally connected at its other end, as at 18, to the inner end of lever 10. A portable electric drill is shown mounted in holder 12 at 19 and comprises an electric motor 20 with a drill 21 mounted in its chuck 22. The extension cord for the motor 20 is not shown but there is a hanger 23 on the upper end of the column 4 for support of this cord to keep it out of the way. A socket 24 is provided for reception of the plug on the end of the cord. The motor 20 has its own control switch (not shown) provided thereon. As illustrated, the drill holder bracket 6 may be turned with respect to column 4 as an axis through 360°, the drill 21 being shown in Fig. 1 adjusted through 180° for drilling behind the base 5 in a large work piece 25, while the holding surface 26 of the electro-magnetic base 5 is down in contact with the surface of the work 25. When the electro-magnetic base 5 is not inverted and the holding surface 26 is up it is adapted to serve to hold small work pieces electro-magnetically for drilling.

The magnet coil 27 in the base 5 is connected by means of a cable 28 with a rectifier 29, which in turn is connected through a reversing switch 30 and cable 31 with a source of alternating current supply. When the switch 30 is thrown to the right ("on") and the core 32 in the electro-magnetic base 5 is accordingly magnetized, a plate 33 that is fastened detachably by screws 34 on the side 47 opposite the holding surface 26 serves to complete the magnetic flux path so long as the holding surface 26 is in contact with the work 25. This plate is removed when the base 5 is turned back to its normal position and the stand is set on a metal plate or bench to complete the magnetic flux path while small work pieces to be drilled are held electro-magnetically on the holding surface 26. When the switch 30 is thrown momentarily to the left ("demagnetize") the direction of current flow through the coil 27 is reversed and the base 5 is accordingly demagnetized so that it may be moved from one place to another on the work 25, or, if it is being used for the holding of small parts for drilling, the small parts that have been held electromagnetically may be removed. The switch 30 is left in the middle or "off" position between operations. While I have shown a rectifier 29, it should, of course, be understood that the invention is not to be regarded as limited in that way, inasmuch as wet or dry batteries furnishing direct current suitable for the present purposes could be used. The rings indicated at 35 and 35' are non-magnetic pole separators.

A non-magnetic bottom or end piece 36 is provided on the lower end of the column 4 where the column is attached to the base 5 on a horizontal post 37 for reversibility of the base with respect to the stand and angular adjustment of the stand with respect to the base, the piece 36 serving to keep the magnetic flux from passing through the drill.

The post 37 extends at right angles relative to the surface 38 on a boss 39 provided on one side of the base 5 and has a reduced, threaded end portion 40 on which a nut 41 is threaded bearing against a washer 42 and nonrotatable collar 43 to clamp the non-magnetic part 36 firmly in accurately adjusted relation to the base 5. Parallel flats 44 are provided on diametrically opposite sides of the hub of the part 36 where index marks 45 are provided, the position of which with respect to the graduations 46 provided on the flat surface 38 indicates accurately the angularity of the column 4 with respect to the base 5.

In operation, the electro-magnetic base 5 is normally used with the plate 33 removed so that the surface 47 which is normally on the bottom has face to face, metal to metal contact with a metal plate or bench top to complete the magnetic flux path to enable holding small work pieces in contact with the holding surface 26 that is normally on top. Thus, the base is held firmly to the plate or bench with the same magnetic attraction active on the work pieces to hold them in place during drilling. The drill holder 12 can be swung through 360° around the column 4 with the bracket 6 to locate the drill 21 at whatever position is desired, and when the electro-magnetic base 5 is inverted, as shown in Fig. 1, and the plate 33 is applied to surface 47 to complete the magnetic flux path while surface 26 is in face to face, metal to metal contact with the work 25, the drill holder 12 is swung around the column 4 to the position shown in Fig. 1 for drilling directly into the work piece 25 on which the drill stand is set. It is in this use of the drill stand principally that the angular adjustability of the column 4 with respect to base 5 is of special advantage, although there may be instances also where the work piece to be drilled is held on surface 26 that an angular setting of the column 4 may be advantageous. With the holding surface 26 up or down or at any angle therebetween the switch 30 is thrown to the "on" position for magnetization of the soft iron core 32 and later when the hold is to be released, the switch 30 is thrown to the demagnetization position momentarily to reverse the direction of current flow and is then thrown to the "off" position.

It is believed the foregoing description conveys a good understanding of the objects and advantages of my invention. The appended claims have been drawn to cover all legitimate modifications and adaptations.

I claim:

1. A drill unit comprising a column, a holder for an electric drill, means mounting the holder on the column for rotary adjustment with respect to the column as an axis and for up and down motion relative to the column, and an electro-magnetic base rigidly but adjustably supporting said column on one side thereof, said base being adapted in one operative position relative to said column to secure the drill unit electro-magnetically to a metal work piece into which a hole or holes are to be drilled, and being also adapted in another operative position relative to said column to secure a metal work piece on the top thereof electro-magnetically for the drilling of a hole or holes therein, said base being rotatably reversible and angularly adjustable with respect to said column about an axis substantially at right angles to said column, the unit including means for securing said column in rigid relationship to said base adjusted about said axis to a selected angularity relative to said column.

2. A drill unit comprising a column, a holder for an electric drill, means mounting the holder on the column for rotary adjustment with respect to the column as an axis and for up and down motion relative to the column, and an electro-magnetic base rigidly but adjustably supporting said column on one side thereof, said base being adapted in one operative position relative to said column to secure the drill unit electro-magnetically to a metal work piece into which a hole or holes are to be drilled, and being also adapted in another operative position relative to said column to secure a metal work piece on the top thereof electro-magnetically for the drilling of a hole or holes therein, said base being rotatably reversible and angularly adjustable with respect to said column about an axis substantially at right angles to said column, the unit including means for securing said column in rigid relationship to said base adjusted about said axis to a selected angularity relative to said column, and the unit further including a non-magnetic element forming a part of the adjustable connection between the column and base to isolate the electric drill from the magnetic flux in said base.

References Cited in the file of this patent

UNITED STATES PATENTS

| 1,010,975 | Stroner et al. | Dec. 5, 1911 |
| 1,023,921 | Brown | Apr. 23, 1912 |

FOREIGN PATENTS

| 583,158 | Great Britain | Dec. 10, 1946 |
| 456,266 | Canada | May 3, 1949 |
| 464,672 | Italy | July 19, 1951 |